(12) United States Patent
Taylor

(10) Patent No.: US 12,535,837 B2
(45) Date of Patent: Jan. 27, 2026

(54) METHOD AND APPARATUS FOR A WELL-BASED GROUNDWATER DELIVERY SYSTEM

(71) Applicant: Well Sense Technologies, Winchester, CA (US)

(72) Inventor: Bryan Taylor, Winchester, CA (US)

(73) Assignee: Well Sense Technologies, Winchester, CA (US)

( * ) Notice: Subject to any disclaimer, the term of this patent is extended or adjusted under 35 U.S.C. 154(b) by 17 days.

(21) Appl. No.: 18/144,689

(22) Filed: May 8, 2023

(65) Prior Publication Data

US 2023/0376051 A1    Nov. 23, 2023

Related U.S. Application Data

(60) Provisional application No. 63/342,829, filed on May 17, 2022.

(51) Int. Cl.
| | |
|---|---|
| *G05D 9/12* | (2006.01) |
| *G08C 17/00* | (2006.01) |
| *H04Q 9/00* | (2006.01) |

(52) U.S. Cl.
CPC .............. *G05D 9/12* (2013.01); *G08C 17/00* (2013.01); *H04Q 9/00* (2013.01); *H04Q 2209/40* (2013.01); *H04Q 2209/823* (2013.01)

(58) Field of Classification Search
CPC . G05D 9/12; G08C 17/00; H04Q 9/00; H04Q 2209/40; H04Q 2209/823
See application file for complete search history.

(56) References Cited

U.S. PATENT DOCUMENTS

| | | | | |
|---|---|---|---|---|
| 5,858,071 | A * | 1/1999 | Nilsson | C02F 1/20 55/340 |
| 8,760,089 | B2 * | 6/2014 | Smith | H02P 27/085 318/785 |
| 9,751,782 | B2 * | 9/2017 | McCurdy | C02F 1/5272 |
| 9,879,510 | B2 * | 1/2018 | Lisk | E21B 43/128 |
| 2003/0106582 | A1 * | 6/2003 | Jeong | G05D 9/12 137/12 |
| 2010/0276294 | A1 * | 11/2010 | Lambie | C02F 1/4674 205/335 |
| 2011/0174706 | A1 * | 7/2011 | Russell | A01G 25/00 405/36 |
| 2020/0240418 | A1 * | 7/2020 | Correia | F04B 49/065 |

* cited by examiner

*Primary Examiner* — Connor J Tremarche
(74) *Attorney, Agent, or Firm* — Michael T Wallace

(57) ABSTRACT

A well-based, groundwater delivery system provides a wireless control network that is used to report system performance via measured operational metrics. Such metrics facilitate monitoring of operational parameters associated with the well-based, groundwater delivery system and closed-loop control feedback to automatically implement measures to prevent damage. Sensors are used to measure volumes of water stored within the well-based, groundwater delivery system as well as water flow rates. Soft mounted sensors allow accurate measurements to be taken regardless of the mounting orientation of the sensor or the degree of plumb exhibited by water storage tanks of the well-based, groundwater delivery system. Automated status and control is established wirelessly via a base controller that may be accessed locally by a portable user device or accessed remotely via an external network.

14 Claims, 6 Drawing Sheets

METHOD AND APPARATUS FOR A WELL-BASED GROUNDWATER DELIVERY SYSTEM

FIELD OF THE INVENTION

The present invention generally relates to well-based groundwater delivery systems, and more particularly to automated controls and monitoring systems associated with well-based groundwater delivery systems.

BACKGROUND

Well-based groundwater delivery systems have been utilized to retrieve and provide groundwater to residential dwellings and/or commercial operations when fresh water utilities are not provided by the municipality within which such residential dwellings and/or commercial operations reside. Such well-based groundwater delivery systems may extract groundwater from underground aquifers that may extend from just below the earth's surface to many tens of thousands of feet below the earth's surface. Those aquifers located closer to the earth's surface, however, may be more likely to be used for water supply and irrigation due to the likelihood that such aquifers may be replenished by surface precipitation (e.g., rain and/or snow melt) as well as the relative ease by which groundwater may be extracted.

Aquifers may be formed below the earth's surface where groundwater fills the spaces between porous elements such as gravel, sand, sandstone, and/or fractured rock (e.g., limestone). Groundwater contained within the aquifer may be accessed by inserting a pipe into the aquifer to form a well that may extend from the earth's surface to a depth that is below the water table defined by the aquifer. A water-submersible pump may be located within the pipe and used to transfer the groundwater contained within the pipe into a storage tank that may exist at the earth's surface or just below the earth's surface (e.g., in the form of a cistern tank). A pressure tank may then access the water stored in the storage tank so as to provide the water at a regulated pressure to the residential or commercial facility within which the pressure tank is provisioned.

Extraction of groundwater from an aquifer, however, may only be made possible so long as the water table remains at a level that is above the depth of the well, or more precisely, above the depth of the submersible pump that is contained within the well. Once enough groundwater has been extracted from the aquifer to lower the water table below the depth of the submersible pump or for other reasons, no more groundwater may be extracted until such time that the water table depth has been replenished to a sufficient level by, for example, the seepage of surface-based precipitation (e.g., rain and/or snow melt) into the aquifer.

Conventional well-based control systems, however, fail to adequately monitor conditions related to the water table and by extension, fail to adequately monitor metrics (e.g., water levels and flow rates) associated with the storage/pressure tanks and infrastructure utilized to ultimately deliver the groundwater from the aquifer to the end user. As a result, a conventional well may "dry up" before adequate notice has been provided to the end user, which may result in many thousands of dollars of repairs necessary (e.g., due to overheated/damaged submersible pumps) to return the well system to operational status once the well system's capacity has been exceeded. Alternately, inadequate flow sensing may lead conventional systems to overfill the storage tank, thereby leading to a flood condition, or underfill the storage tank, thereby leading to inadequate operation of the pressure tank.

Efforts continue, therefore, to develop a robust, well-based groundwater monitor and control system that communicates trouble conditions based on monitored metrics associated with all aspects of the well-based groundwater delivery system and to automatically rectify such trouble conditions if necessary.

SUMMARY

To overcome limitations in the prior art, and to overcome other limitations that will become apparent upon reading and understanding the present specification, various embodiments of the present invention disclose methods and apparatus for monitoring metrics related to the operational status of any well-based, groundwater delivery system. Control and monitoring systems in accordance with the present invention may be made to be closed-loop, whereby control feedback may be utilized to control parameters associated with such metrics while also automatically notifying users utilizing the well-based, groundwater delivery system as to its operational status. In addition, high-voltage wiring and float switches traditionally used by conventional well-based, groundwater delivery systems may be substantially replaced by the various embodiments of the present invention while ensuring accurate measurements regardless of the geometric orientation of any given component of the well-based, groundwater delivery system.

In accordance with one embodiment of the invention, a water delivery system comprises a well including a submersible pump, a storage tank coupled to the well and configured to store groundwater received from the well. The storage tank includes a sensor configured to measure a volume of water contained within the storage tank. The sensor is configured to maintain a constant relationship with respect to a surface of the volume of water irrespective of a mounted orientation of the storage tank. The water delivery system further comprises a controller wirelessly coupled to the storage tank. The controller is configured to wirelessly issue commands to the submersible pump based on the measured volume of water.

In accordance with an alternate embodiment of the invention, a method of operating a water delivery system comprises pumping water from a well to establish a first water level within a first storage tank, pumping water from the first storage tank to establish a second water level within a second storage tank, wirelessly controlling a first flow rate of water into the first storage tank to maintain the first water level, wirelessly controlling a second flow rate of water into second first storage tank to maintain the second water level and wirelessly monitoring the first and second flow rates and the first and second water levels.

In accordance with an alternate embodiment of the invention, a water delivery system comprises a set of water delivery components including first and second water tanks and first and second water pumps. The water delivery system further comprises a base controller wirelessly coupled to the set of water delivery components and configured to issue commands to the set of water delivery components and a user device wirelessly coupled to the base controller and configured to receive status information relative to the set of water delivery components.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
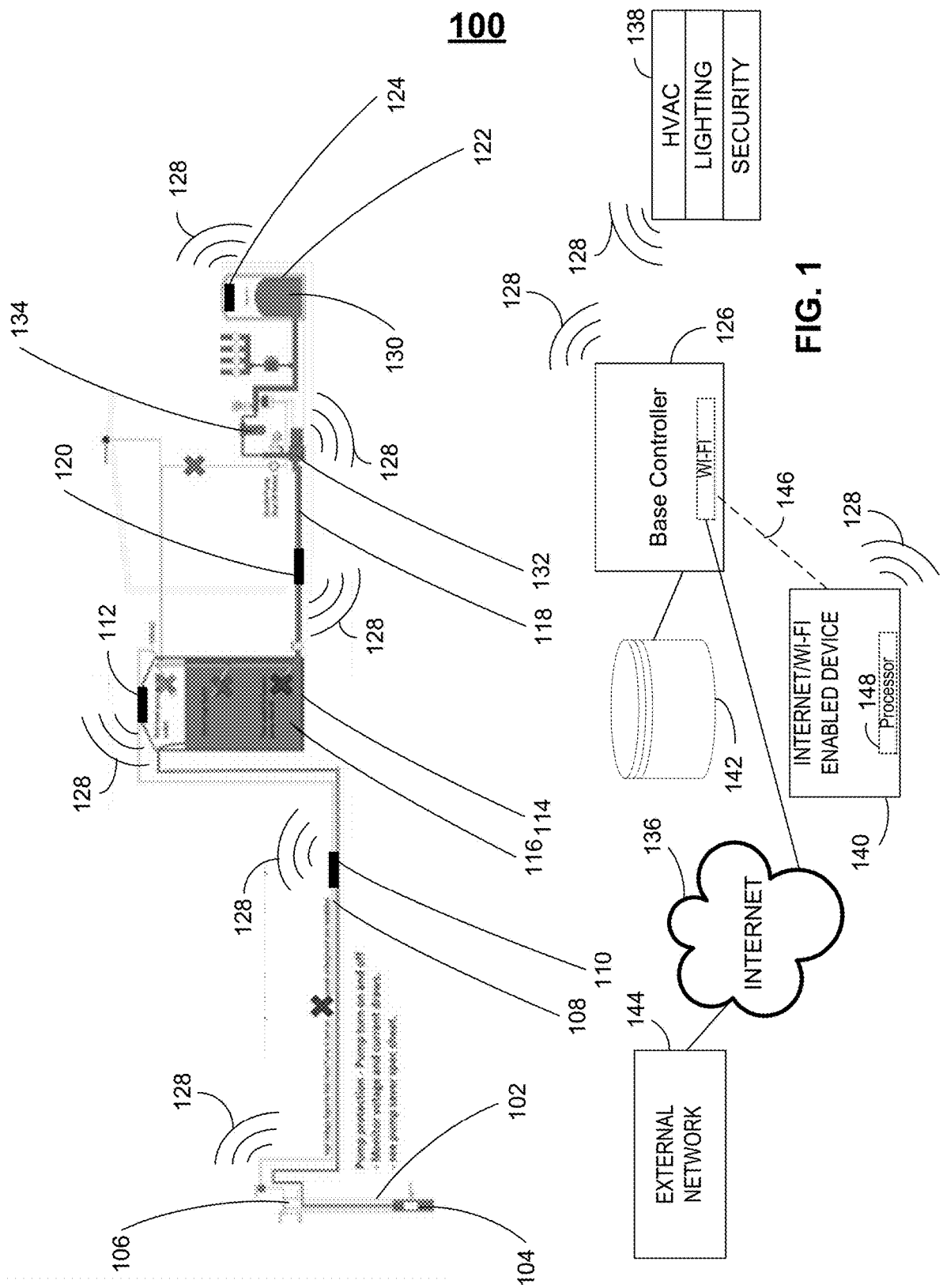
FIG. 1 illustrates a block diagram of a well-based, groundwater delivery system in accordance with an embodiment of the present invention.

Generally, the various embodiments of the present invention are applied to a well-based, groundwater delivery system that eliminates many traditional elements of such systems, while increasing functionality. In one embodiment, for example, measurements (e.g., Time of Flight (ToF) measurements) may be taken to measure the volume of water that may be contained within a storage tank of a well-based, groundwater delivery system and to measure a rate of flow of water at various stages within the well-based, groundwater delivery system. In other embodiments, pressure transducers, reed switches, radar/sonar and other ranging technologies may be used in place of ToF for volume/flow rate sensing.

As per one example, a sensor (e.g., a ToF sensor) may be oriented (e.g., integrated into a top cover) of a storage tank and allowed to propagate an object, particle or wave (e.g., an acoustic or electromagnetic wave) from the top of the storage tank through both mediums contained within the storage tank (e.g., the air and water mediums contained within the storage tank), the object, particle or wave then being reflected back to the sensor (e.g., via the bottom of the storage tank) through both mediums (e.g., the water and air mediums contained within the storage tank). The sensor may then measure the amount of time taken for the round trip to complete.

Software (e.g., firmware) executed by a processor coupled to the sensor may then compute the volume of air and water contained within the storage tank based on the measurements taken (e.g., roundtrip time elapsed) and the known constants relating to the storage tank (e.g., the 3-dimensional interior dimensions of the storage tank). Once the volume of water in the storage tank is computed/measured (e.g., via the use of ToF measurements, pressure measurements, reed switch actuations, Hall effect sensors, radar, sonar, etc.) closed-loop feedback may be utilized to automate any action that may be necessary (e.g., begin filling or stop filling the storage tank) in response.

Mounting of the sensor (e.g., ToF sensor) may be accomplished in such a way that the angle of incidence of the object, particle or wave that may be transmitted by the sensor onto the surface of the water contained within the storage tank may always be orthogonal to the surface of the water no matter the degree of plumb established by the storage tank or the geometric orientation of the sensor. If, for example, the storage tank is not level (e.g., the longitudinal axis of the storage tank creates a non-zero angle with respect to the vertical axis), then the surface of the water stored within the storage tank may exhibit an angle with respect to the angle of incidence of the object, particle or wave that may be transmitted by the hard-mounted sensor and may, therefore, cause erroneous water volume measurements to be taken.

In one embodiment, therefore, the sensor may not be hard mounted, but rather soft mounted such that the sensor may assume a geometric orientation such that the angle of incidence of the object, particle or wave transmitted by the sensor may be self-corrected by the soft mount to be orthogonal to the surface of the water contained within the storage tank. As such, a perpendicular angle of incidence of the object, particle or wave transmitted by the sensor may be formed with respect to the surface of the water contained within the storage tank without regard to the storage tank's orientation or the particular mounting location of the sensor.

Sensors (e.g., ToF sensors or sonar-based sensors), for example, may further be utilized to determine a flow rate of water at any stage within the well-based, groundwater delivery system. As such, a rate of flow of a particular volume of water may be determined, for example, between the submersible pump contained within the well and the storage tank to determine an amount of time needed to fill the storage tank to a predetermined water volume (e.g., as determined by the sensor/processor combination discussed above). Conversely, a rate of flow of a particular volume of water may be determined, for example, between the storage tank and the pressure tank to determine an amount of time needed to fill the pressure tank to a predetermined volume (e.g., as determined by the sensor/processor combination as discussed above). Still further, sensors (e.g., ToF sensors or sonar-based sensors) may be provisioned anywhere along the infrastructure interconnecting each component of the well-based, groundwater delivery system so as to determine whether such flow rates are adequate to meet demand and/or prevent damage that may otherwise be caused by a "dry well" or other adverse condition.

Other metrics may also be tracked and automatically reported to a user and/or an automated metric collection system. For example, the submersible pump of the well may be monitored for proper operation, such that an electronic metric (e.g., a voltage magnitude applied to a motor of the pump) may be monitored and compared to a threshold magnitude (e.g., a low-voltage magnitude threshold) to determine whether an error condition (e.g., a tripped circuit breaker) exists. An additional electronic metric (e.g., a current magnitude as conducted by a motor of the pump) may be monitored to determine, for example, whether an adverse current condition exists such as an increasingly large magnitude of current as may be drawn by an aging pump.

Infrastructure used to report the operational information associated with a well-based, groundwater delivery system may include a wired infrastructure, a wireless infrastructure or a combination of both. Virtually any one or more wireless protocols may be implemented, such as Wi-Fi, Bluetooth, thread-based mesh, Bluetooth mesh, Low Power, Wide Area Network (LPWAN), etc. as well as any number of wired protocols (e.g., Ethernet) to communicate operational parameters and analyzed metrics that may be used to close the feedback loop that may be required to automatically control the well-based, groundwater delivery system.

Turning to FIG. 1, well-based, groundwater delivery system 100 is exemplified, which among other components, may contain well 102, submersible pump 104, storage tank 114 and pressure tank 122. Well 102 may extend from the ground surface (not shown) to a level below the ground surface that is sufficiently deep to penetrate the underlying aquifer (not shown). Well head 106 may include infrastructure (e.g., two-phase alternating current (AC) power, control switches and measurement/monitor devices) that may be necessary to operate submersible pump 104. In addition, well-head 106 may gather operational metrics that may then be used by a closed-loop control system (e.g., as implemented via wireless network 128) to maintain operation of submersible pump 104 within safe operational constraints. For example, submersible pump 104 may include ranging technology (e.g., sonar, ToF, radar, etc.) that may be used to determine the level of the water table within which submersible pump 104 may be inserted.

Control switches (not shown) that may be contained within well head 106 may be controlled (e.g., wirelessly controlled via wireless network 128) to maintain water volume 116 of storage tank 114 within operational limits. In one embodiment, for example, tank controller 112 may be installed within proximity to storage tank 114 (e.g., integrated within the cover of storage tank 114) so as to monitor water volume 116. Once water volume 116 falls below a minimum volume threshold, tank controller 112 may communicate (e.g., wirelessly communicate via wireless network 128) instructions to well head 106 sufficient to commence operation of submersible pump 104 to ultimately begin filling storage tank 114 with groundwater. A flow sensor (e.g., ToF flow sensor 110) may additionally be monitored (e.g., wirelessly monitored via wireless network 128) to ensure that once submersible pump 104 has been activated, a commensurate flow rate of water has been established via water pipe 108.

Once water volume 116 reaches a maximum volume threshold, tank controller 112 may communicate (e.g., wirelessly communicate via wireless network 128) instructions to well head 106 sufficient to cease operation of submersible pump 104 to ultimately stop filling storage tank 114 with groundwater. Flow sensor 110 may additionally be monitored (e.g., wirelessly monitored via wireless network 128) to ensure that once submersible pump 104 has been deactivated, a zero flow rate of water has been obtained within water pipe 108.

Similarly, tank controller 124 may be installed within proximity to pressure tank 122 (e.g., integrated within the cover of pressure tank 122) so as to monitor water volume 130. Once water volume 130 falls below a minimum volume threshold, tank controller 124 may communicate (e.g., wirelessly communicate via wireless network 128) instructions to pump 132 sufficient to commence operation of pump 132 to ultimately begin filling pressure tank 122 with groundwater (e.g., as may be filtered by filter 134) that may be stored within storage tank 114. A sensor (e.g., ToF flow sensor 120) may additionally be monitored (e.g., wirelessly monitored via wireless network 128) to ensure that once pump 132 has been activated, a commensurate flow rate of water has been established via water pipe 118.

Once water volume 130 reaches a maximum volume threshold, tank controller 124 may communicate (e.g., wirelessly communicate via wireless network 128) instructions to pump 132 sufficient to cease operation of pump 132. Flow sensor 120 may additionally be monitored (e.g., wirelessly monitored via wireless network 128) to ensure that once pump 132 has been deactivated, a zero flow rate of water has been established via water pipe 118.

In one embodiment, wireless network 128 may support multiple protocols, such as a low-power, wide area networking protocol (e.g., thread-based mesh) that may be used to interconnect Internet of Things (IoT) components (e.g., battery operated tank controllers 112 and 124 of FIG. 1) with other components (e.g., base controller 126) through the same low-power, wide area networking protocol or via other wireless networking protocols (e.g., Wi-Fi, Bluetooth, Bluetooth mesh, etc.). As such, operational metrics (e.g., voltage and current magnitude levels) associated with the components controlled by wireless network 128 (e.g., submersible pump 104) may be communicated wirelessly (e.g., via wireless network 128 to base controller 126 and/or device 140).

As per one example, wireless network 128 may communicate the overall health of submersible pump 104 and/or may initiate automated control of submersible pump 104 to maintain submersible pump 104 within operational constraints thereby preserving the operational life of submersible pump 104. The viability (e.g., water table level) established by the aquifer (not shown) within which submersible pump 104 may be inserted may also be ascertained (e.g., via ToF, sonar, or other ranging technologies as may be operational within submersible pump 104) and reported (e.g., by submersible pump 104 via well head 106 to base controller 126) so as to alert the end user as to the overall status of the aquifer.

Similarly, for example, operational parameters may be wirelessly communicated (e.g., to base controller 126 and/or device 140) that may reflect the fill level of storage tank 114 and/or pressure tank 122 and whether storage tank 114 and/or pressure tank 122 are currently in the process of being filled. As discussed below, base controller 126 and/or device 140 may also be capable of wirelessly implementing closed-loop control of the various operational components of well-based, groundwater delivery system 100.

As per one example, status information associated with submersible pump 104 may be communicated to base controller 126 and/or device 140 to indicate an over-current condition. In response, base controller 126 and/or device 140 may issue a stop command to well head 106 via network 128, which may be effective to disconnect AC power to submersible pump 104 in order to avoid potential damage. Conversely, well head 106 may first shut off submersible pump 104 upon the detection of an over-current condition in the interest of time and then communicate the over-current condition to base controller 126 and/or device 140 via wireless network 128. Such a control command may further cause a status alert to be issued to the user via base controller 126 or directly to device 140 so that the appropriate maintenance personnel may be dispatched manually by the user, or conversely, automatically dispatched by base controller 126 (e.g., via Internet 136).

Wireless network 128 may similarly be used throughout the facility (e.g., residential home) for status and control of other components 138 (e.g., heating, ventilation and air conditioning (HVAC) systems, lighting and security systems) either locally (e.g., via device 140 or base controller 126) or remotely via external network 144, which may be implemented as a building automation and control network (e.g., BACnet). In one embodiment, base controller 126 may act as a BACnet access point (e.g., a thread-enabled border router) to allow external network 144 (e.g., a BACNet network) to obtain status and gain control of components 138 and/or any one or more of the other components interconnected by wireless network 128.

Device 140 (e.g., a portable smartphone or tablet) may be used to control and receive operational status of each component of well-based, groundwater delivery system 100. As per one example, device 140 may send a control signal either directly (e.g., via wireless network 128) or indirectly to base controller 126 (e.g., via Wi-Fi connection 146), which may then cause well head 106 to either start or stop the operation of submersible pump 104. In response, device 140 may receive water flow information from sensor 110 (e.g., via wireless network 128 or Wi-Fi interface 146) to verify that submersible pump 104 has been commanded correctly. Alternately, device 140 may send a control signal to pump 132 (e.g., directly via network 128 or indirectly through base controller 126 via Wi-Fi interface 146) to cause pump 132 to either start or stop its operation and may receive water flow information from sensor 120 (e.g., directly via network 128 or indirectly through base controller 126 via Wi-Fi interface 146) to verify that pump 132 has been commanded correctly.

In alternate embodiments, base controller 126 may completely automate the operation of well-based, groundwater delivery system 100 by, for example, accessing operational parameters from database 142, which may then be used to control well-based, groundwater delivery system 100 in an automated, closed-loop fashion to produce a specific effect. As per one example, acceptable water volume thresholds (e.g., minimum and maximum water volume thresholds) for storage tanks 114 and 122 may be retrieved from database 142 by base controller 126 and compared to water volume measurements taken by tank controllers 112 and 124. In response, base controller 126 may command pumps 104 and 132, respectively, as needed to maintain such water volumes accordingly.

Well-based, groundwater delivery system 100 may, for example, be sensitive to control signals as may be provided by controlling entities (e.g., external network 144) that may exist external to network 128. As per one example, one or more controlling entities may issue control signals bound for well-based, groundwater delivery system 100 as may be transmitted by external network 144 (e.g., a BACnet network) via Internet 136 and propagated throughout well-based, groundwater delivery system 100 via base controller 126. Conversely, status information related to well-based, groundwater delivery system 100 may be gathered by base controller 126 and may then be disseminated to external network 144 (e.g., a BACnet network) via Internet 136. Accordingly, many well-based, ground water delivery systems as exemplified by FIG. 1 may coexist and may be geographically dispersed and remotely controlled via a single control station that may exist within external network 144 (e.g., a BACnet network).

Figure 2:
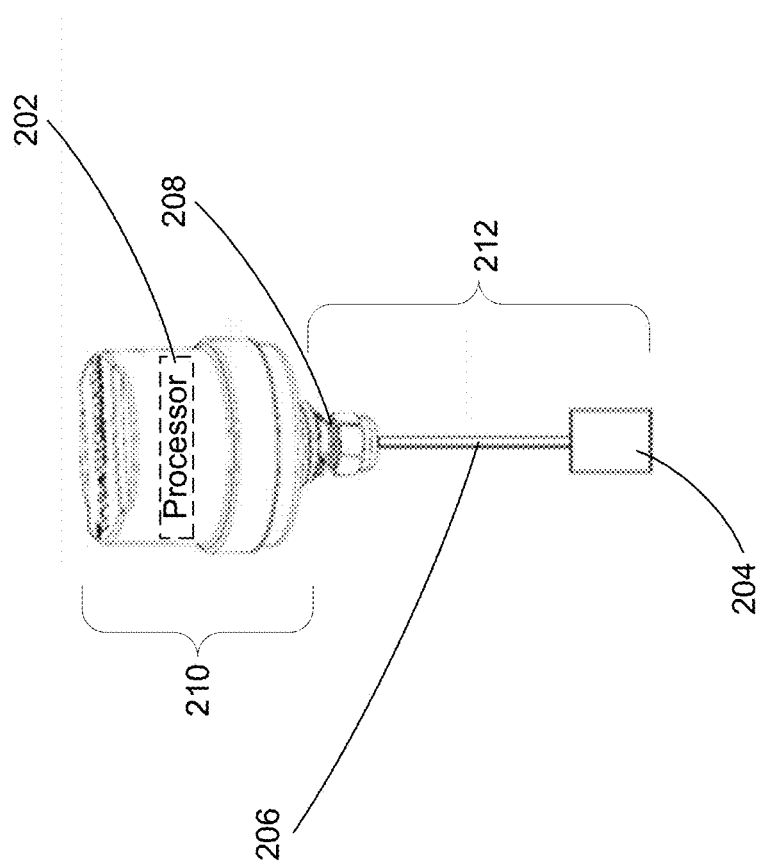
FIG. 2 illustrates a tank controller in accordance with an embodiment of the present invention.

Turning to FIG. 2, tank controller 200 (e.g., as discussed above in relation to tank controllers 112 and 124 of FIG. 1) is exemplified, which may include processor 202, a sensor (e.g., ToF sensor 204) and soft-mount 206, which may mechanically and electrically connect sensor 204 to tank mount portion 208 so as to enable communications between sensor 204 and processor 202. In one embodiment, portion 210 of controller 200 may be disposed above its associated tank (e.g., as discussed above in relation to storage tank 114 and/or pressure tank 122 of FIG. 1) whereas portion 212 may be disposed within an interior of its associated tank (e.g., storage tank 114 and/or pressure tank 122 of FIG. 1). In addition, portion 210 may be composed of a non-conductive element (e.g., plastic) such that processor 202 may establish wireless communications (e.g., via Wi-Fi, Bluetooth, Thread-based mesh, Bluetooth mesh, LPWAN) with other components of well-based, groundwater delivery system 100 as discussed herein.

Tank controller 200 may further include various operational power options. As per one example, tank controller 200 may include a battery (not shown) so as to provide operational power to sensor 204 and processor 202 and other electronics (not shown) that may be contained within portion 210. As per another example, a solar panel (not shown) may be included to provide operational power directly to sensor 204 and processor 202 and other electronics (not shown) that may be contained within portion 210. Alternatively, a solar panel (not shown) may be included as part of a charging circuit, whereby a battery (not shown) of tank controller 200 may be charged during periods of daylight via current as may be generated by the solar panel.

Figure 3:
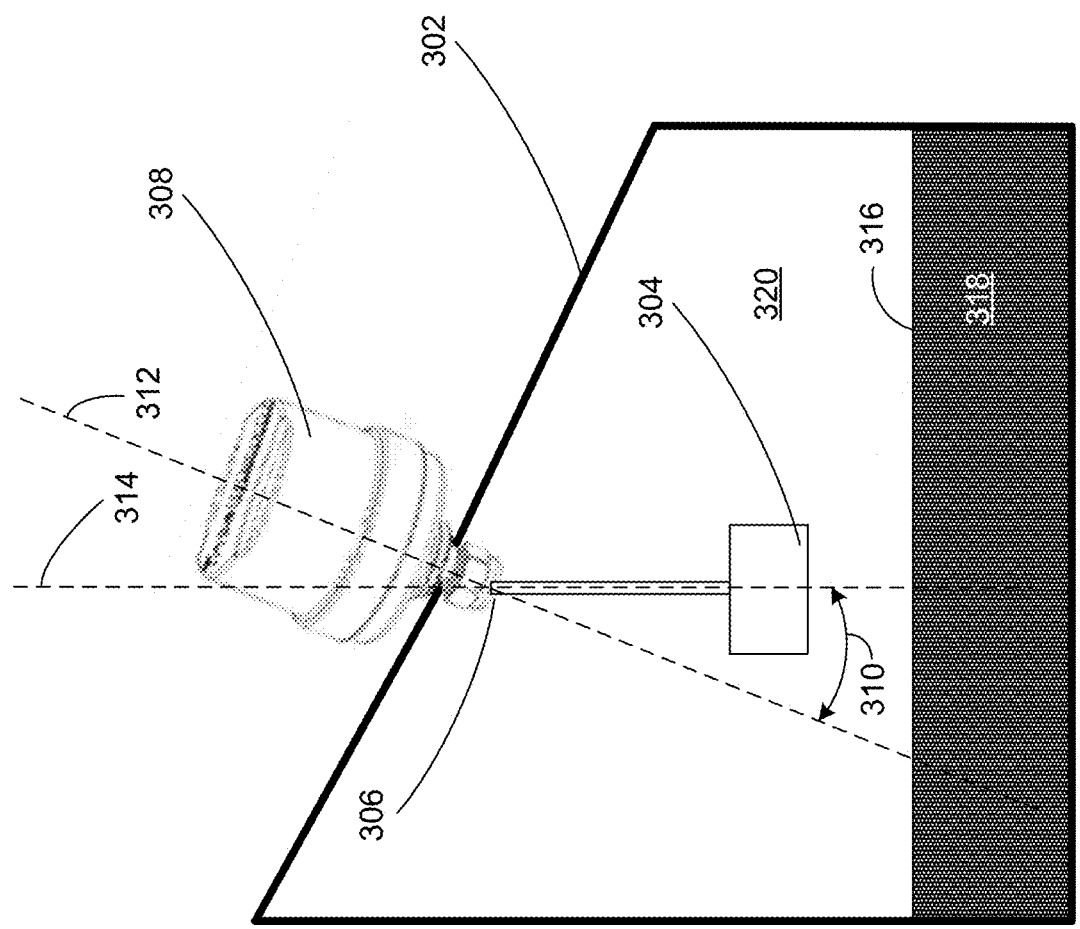
FIG. 3 illustrates a soft-mounted sensor associated with the tank controller of FIG. 2 in accordance with an embodiment of the present invention.

Turning to FIG. 3, tank system 300 is exemplified, which may include tank controller 308 (e.g., as discussed above in relation to tank controllers 112 and 124 of FIG. 1 and tank controller 200 of FIG. 2) and water tank 302 (e.g., as discussed above in relation to storage tank 114 and pressure tank 122). As illustrated, tank controller 308 may be mounted to water tank 302 at a position that creates an angle (e.g., angle 310) between tank controller 308 mounting axis 312 and vertical axis 314. Due to soft-mount 306, sensor 304 may be disposed within tank 302 at a position such that the object, particle or wave (e.g., an acoustic or electromagnetic wave not shown) that may be emitted by sensor 304 may be orthogonally incident upon water surface 316 notwithstanding angle 310 that may exist between mounting axis 312 and water surface 316.

In such an instance, measurements (e.g., ToF measurements) taken by sensor 304 may be made to be more accurate since the object, particle or wave (e.g., an acoustic or electromagnetic wave not shown) emitted by sensor 304 may traverse round-trip travel along axis 314 in both directions. In particular, a direction of travel may extend from sensor 304 downward along axis 314 through air volume 320 and water volume 318 and may be reflected back to sensor 304 via water volume 318 and air volume 320 in an upward direction defined by axis 314. As such, reflections of emissions along axes other than axis 314 may be minimized resulting in improved measurement accuracy.

Turning to FIGS. 4A-4E, various examples of a person-machine interface (PMI) are illustrated as may be executed by a processor (e.g., processor 148 of FIG. 1) that may be contained within a user device (e.g., device 140 of FIG. 1) and that may be in wireless communication (e.g., via wireless network 128 of FIG. 1) with a well-based, groundwater delivery system (e.g., well-based, groundwater delivery system 100 of FIG. 1). The display of the user device may utilize capacitive touch sensing to allow user interaction with each PMI screen generated by the user device display such that a processor (e.g., processor 148 of FIG. 1) may detect the user's touch at a particular location on the display screen of the user device, which may be indicative of the user's requested action. In response, processor 148 may execute the appropriate software (e.g., firmware) that may be executed by processor 148 in response to the user's requested action.

Figure 4B:
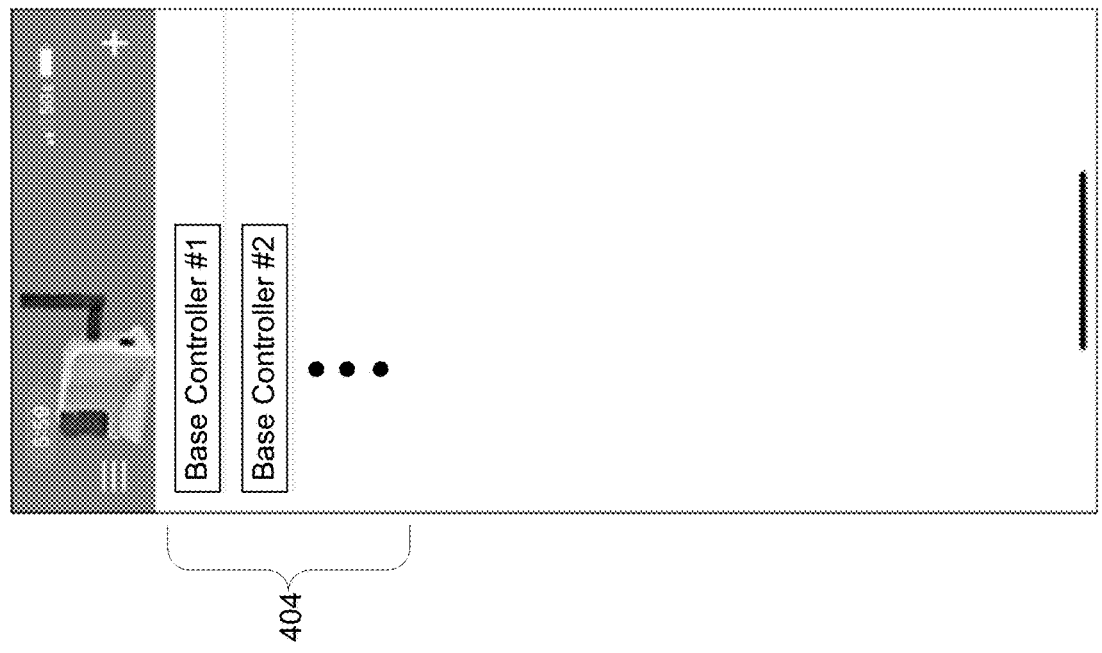
FIGS. 4A-4E illustrate various person-machine interfaces (PMI) as provided by a user device associated with the well-based, groundwater delivery system of FIG. 1.
Figure 4A:
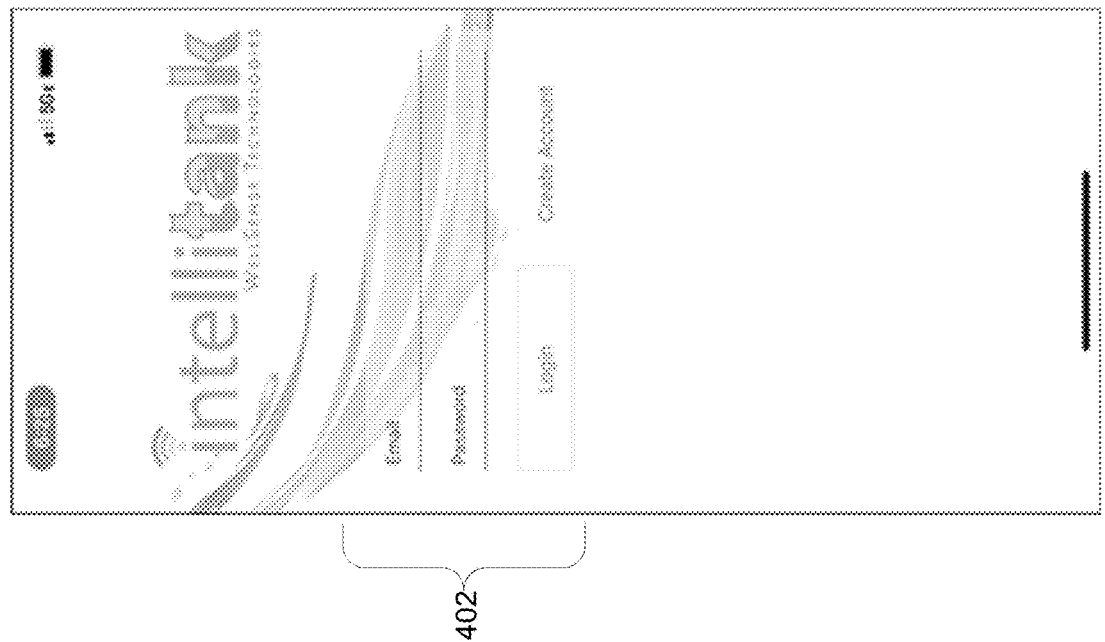

The PMI screen of FIG. 4A exemplifies a login screen, which may be used to authenticate a user of a user device (e.g., device 140 of FIG. 1) by comparing login credentials 402 as entered by a user to credentials that may be stored within a database (e.g., database 142 of FIG. 1) in order to authenticate the user. As per an example, credentials 402 may be transmitted by the user device (e.g., via wireless network 128 of FIG. 1) to a controller (e.g., base controller 126 of FIG. 1) to access a user account already created and existing on database 402 or to create a new user account on database 402.

FIG. 4B exemplifies a pairing screen, which may be used to pair a user device (e.g., device 140 of FIG. 1) to one or more base controllers 404 that may be under control of the user such as may be the case where the user has more than one residential location within which a well-based, groundwater delivery system (e.g., well-based, groundwater delivery system 100 of FIG. 1) may be provisioned. Selection of either Base Controller #1 or Base Controller #2 may, for example, provide the user with real-time status and control of each component provisioned under Base Controller #1 or Base Controller #2, respectively.

Figures 4C, 4D:
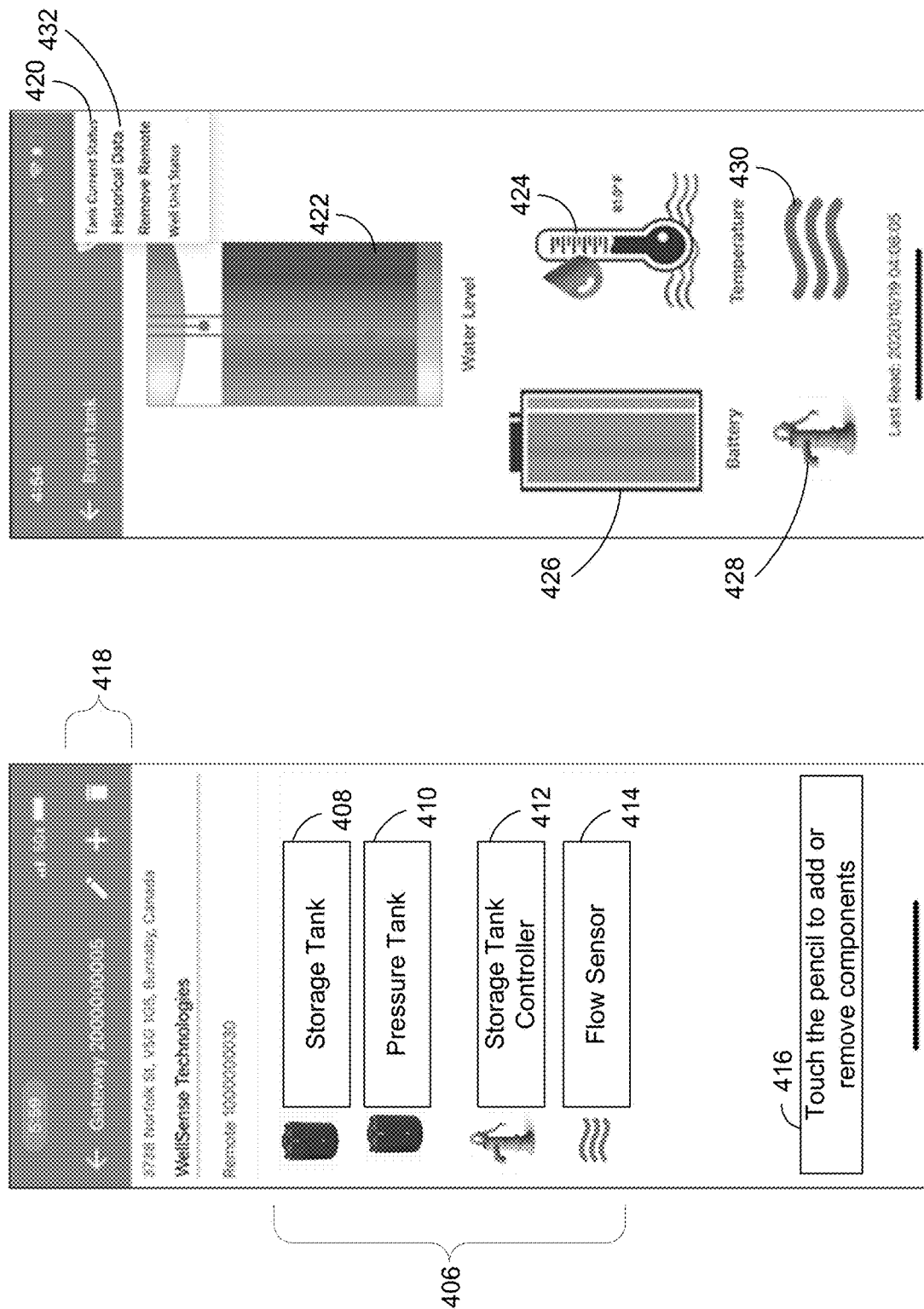

FIG. 4C exemplifies a notification screen, which may be used to select components (e.g., components 406) of a well-based, groundwater delivery system (e.g., well-based, groundwater delivery system 100 of FIG. 1) from which the user wishes to obtain status or to which the user wishes to provide command and control. Detail 416 may instruct the user as to the use of editor commands 418 that may be used to add or remove components 406. As per one example, component 408 (e.g., storage tank 114 of FIG. 1), component 410 (e.g., pressure tank 122), component 412 (e.g., tank controller 112 of FIG. 1) and component 414 (e.g., sensor 110 of FIG. 1) may initially be selected by the user as those components of interest that may be provisioned with the selected base controller (e.g., as discussed above in relation to selection 404 of FIG. 4B).

FIG. 4D exemplifies a status screen that may be used by the user to obtain status information (e.g., from one or more of the components selected by the notification screen of FIG. 4C). As per one example, the status of storage tank 408 (e.g., storage tank 114 of FIG. 1) may be queried by the user and may result in the status report as displayed by the PMI of FIG. 4D.

As shown, pull-down menu selection "Tank Current Status" 420 may be selected by the user to display the current water level 422 and current water temperature 424 of water contained within the storage tank (e.g., storage tank 114 of FIG. 1). In addition, the current status of the tank controller that may be associated with the selected storage tank 408 (e.g., tank controller 112 of FIG. 1) may be ascertained to include the current battery storage level 426 of tank controller 112 and the current general status information indicated by icon 428.

The current general status information indicated by icon 428 may be colored green, or otherwise displayed, to indicate an acceptable condition of tank controller 112. Conversely, icon 428 may be colored red, or otherwise displayed, to indicate an error condition of tank controller 112. In either case, icon 428 may be selected by the user (e.g., by capacitive touch sense) to receive detailed tank controller information as discussed in more detail below in relation to FIG. 4E. Similarly, icon 430 may be selected by the user (e.g., by capacitive touch sense) to receive detailed sensor (e.g., sensor 110 of FIG. 1) information (e.g., whether water is flowing within pipe 108 of FIG. 1 and if so, the current water flow rate).

Status information may be automatically queried (e.g., via base controller 126 of FIG. 1) and automatically collected (e.g., via database 142 of FIG. 1) at programmable intervals in order to maintain an operational history for each component of a well-based, groundwater delivery system (e.g., well-based, groundwater delivery system 100 of FIG. 1). As per one example, such historical information may be recalled and displayed through selection by the user of pull-down menu selection "Historical Data" 432. In one embodiment, such historical data may include snap shots over time of water level 422 and water temperature 424 relating to the selected storage tank.

Figure 4E:
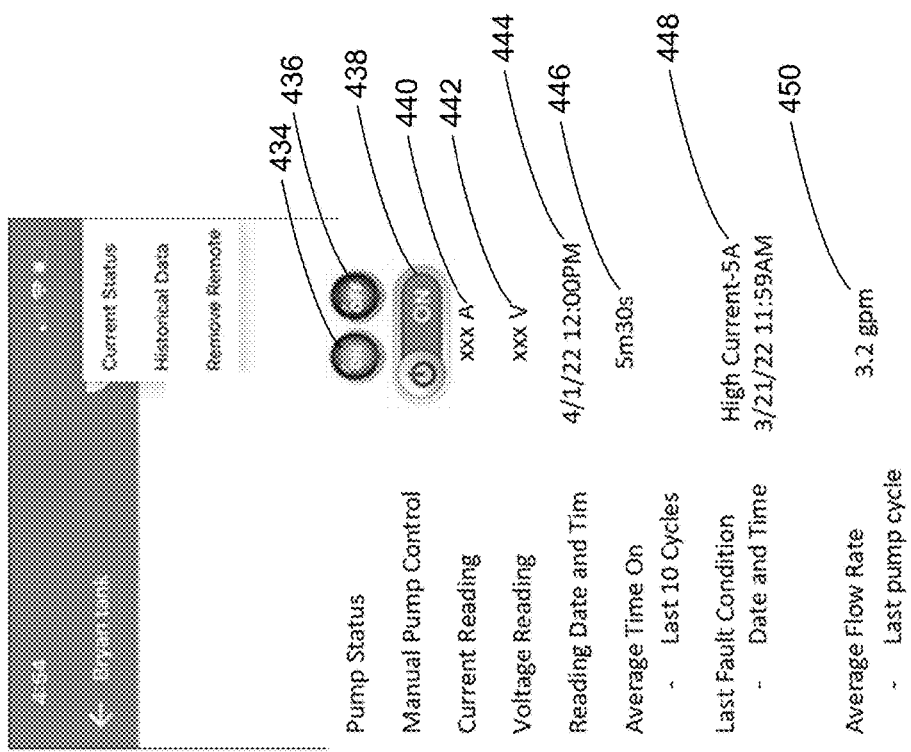

FIG. 4E exemplifies detailed tank controller information as may be the result of selection by the user (e.g., by capacitive touch sense) of the associated icon (e.g., icon 428 as discussed above in relation to FIG. 4D). In particular, the user may query detailed tank controller (e.g., tank controller 112 of FIG. 1) information as it pertains to the selected storage tank (e.g., storage tank 114 of FIG. 1 as selected via storage tank 408 of FIG. 4C). As per one example, status information pertaining to the pump (e.g., submersible pump 104 of FIG. 1) that may be associated with the selected tank controller (e.g., tank controller 112 of FIG. 1) may indicate whether the pump is activated (e.g., as indicated by icon 434) or deactivated (e.g., as indicated by icon 436). The user may elect whether to have direct manual control over the pump (e.g., as may be selected by appropriate selection of icon 438). The magnitude of current conducted by the pump along with the voltage measured at the pump may be reflected by text fields 440 and 442, respectively, along with the time and date that such measurements took place as indicated by status field 444. Historical information may also be reflected by text fields 446, 448 and 450 as they relate, for example, to the average activation time of the pump, the last recorded fault condition of the pump and average flow rate exhibited by the pump, respectively.

Other aspects and embodiments of the present invention will be apparent to those skilled in the art from consideration of the specification and practice of the invention disclosed herein. It is intended, therefore, that the specification and illustrated embodiments be considered as examples only, with a true scope and spirit of the invention being indicated by the following claims.

What is claimed is:

1. A water delivery system, comprising:
a well;
a set of water delivery components including,
   a storage tank and a pressure tank in fluid communication with the well;
   a first water pump submersed within the well and a second water pump coupled between the storage tank and the pressure tank, wherein the first water pump is configured to pump water from the well into the storage tank and the second water pump is configured to pump water from the storage tank into the pressure tank;
   a first sensor coupled between the well, the first water pump and the storage tank, wherein the first sensor is configured to measure a water flow rate produced by the first water pump; and
   a second sensor including a soft mount disposed within the storage tank, wherein the second sensor is configured to measure a round-trip transit time of a wave transmitted through a volume of air and water contained within the storage tank to determine an amount of time needed to fill the storage tank with water based upon the measured water flow rate and round-trip transit time, wherein the soft mount maintains an angle of incidence of the transmitted wave onto a surface of the water that is substantially orthogonal to the surface of the water irrespective of an orientation of the storage tank relative to an orientation of the second sensor;
a base controller wirelessly coupled to the set of water delivery components and configured to issue commands to the set of water delivery components; and
a user device wirelessly coupled to the base controller and configured to receive status information relative to the set of water delivery components.

2. The water delivery system of claim 1, wherein the base controller is further configured to receive status information from the set of water delivery components.

3. The water delivery system of claim 2, wherein the user device is further configured to issue commands to the set of water delivery components.

4. The water delivery system of claim 3, wherein the user device includes a graphical interface configured to display status information.

5. The water delivery system of claim 4, wherein the status information includes voltage and current measurements from the first pump.

6. The water delivery system of claim 5, wherein the graphical interface is further configured to convert inputs from a user to issued commands to the set of water delivery components.

7. The water delivery system of claim 6, wherein the issued commands include turning the first and second pumps on.

8. The water delivery system of claim 7, wherein the issued commands include turning the first and second pumps off.

9. A water delivery system, comprising:
a well;
a first pump submerged within the well;
a storage tank coupled to the well and configured to receive water pumped from the well by the first pump;
a first sensor coupled between the well, the first pump and the storage tank and configured to measure a flow rate from the first pump;
a second sensor including a soft mount disposed within the storage tank, wherein the second sensor is configured to measure a round-trip transit time of a wave transmitted through a volume of air and water contained within the storage tank to determine an amount of time needed to fill the storage tank based upon the measured flow rate and round-trip transit time, wherein the soft mount maintains an angle of incidence of the transmitted wave onto a surface of the water that is substantially orthogonal to the surface of the water irrespective of an orientation of the storage tank relative to an orientation of the second sensor;
a pressure tank coupled to the storage tank;
a second pump coupled to the storage and pressure tanks and configured to pump water from the storage tank into the pressure tank;
a first controller coupled to the storage tank and configured to control the first pump to maintain a first volume of water contained within the storage tank; and
a second controller coupled to the pressure tank and configured to control the second pump to maintain a second volume of water contained within the pressure tank.

10. The water delivery system of claim 9, further comprising a base controller wirelessly coupled to the first and second controllers and configured to display information indicative of the rates of water flow produced by the first and second pumps.

11. The water delivery system of claim 10, wherein the base controller is further configured to wirelessly start the operation of the first pump when the first volume is less than a first water volume threshold.

12. The water delivery system of claim 11, wherein the base controller is further configured to wirelessly stop the operation of the first pump when the first volume is greater than the first water volume threshold.

13. The water delivery system of claim 10, wherein the base controller is further configured to wirelessly start the operation of the second pump when the second volume is less than a second water volume threshold.

14. The water delivery system of claim 13, wherein the base controller is further configured to wirelessly stop the operation of the second pump when the second volume is greater than the second water volume threshold.

* * * * *